June 3, 1958
C. B. LEACH
2,837,075
ENGINE CRANKCASE STRUCTURE
Filed July 12, 1954
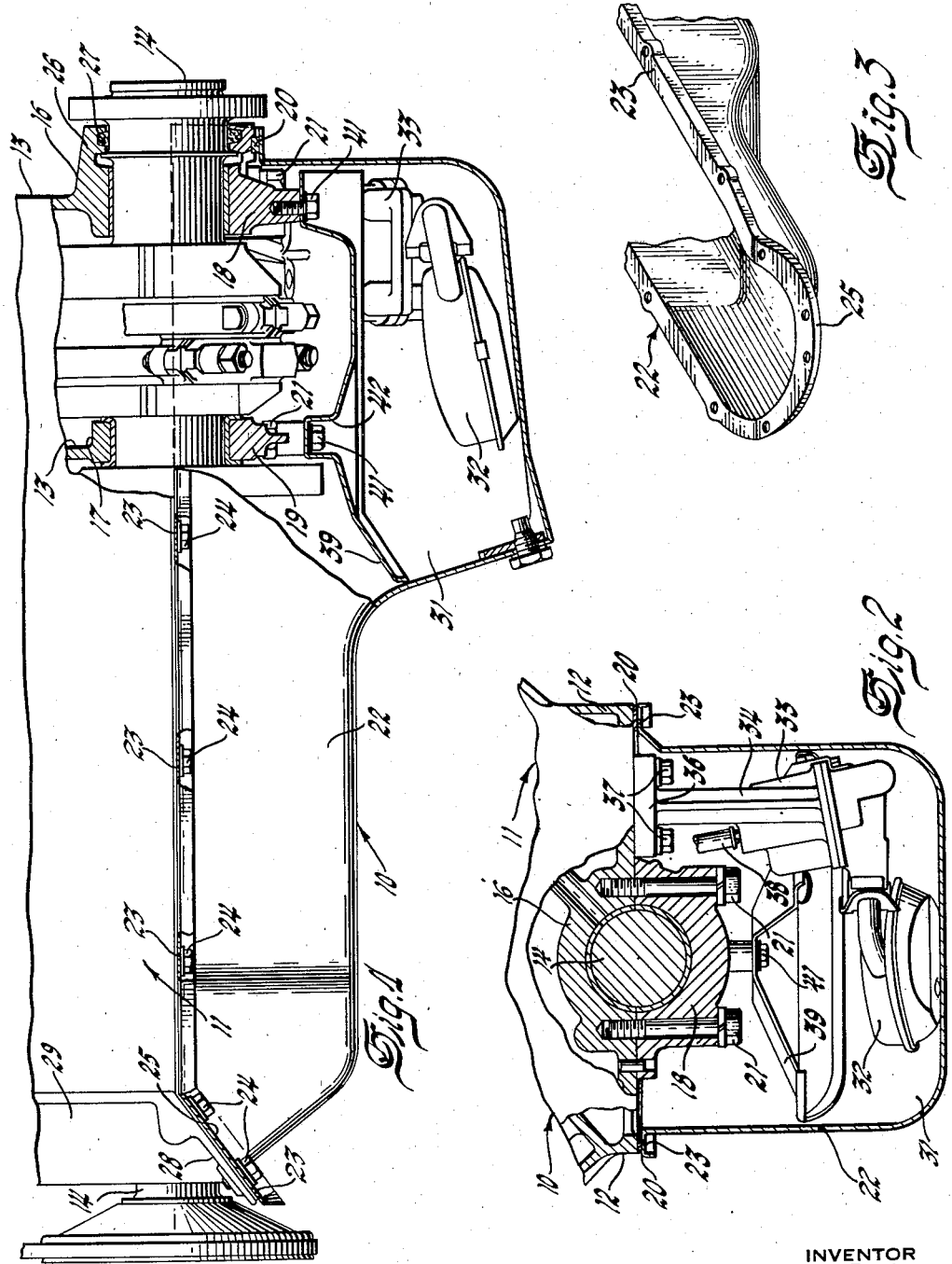
INVENTOR
Clayton B. Leach
BY
L. D. Burch

United States Patent Office 2,837,075
Patented June 3, 1958

2,837,075

ENGINE CRANKCASE STRUCTURE

Clayton B. Leach, Pontiac, Mich., assignor to General Motors Corporation, Detroit, Mich., a corporation of Delaware Application July 12, 1954, Serial No. 442,736

7 Claims. (Cl. 123—195)

This invention relates to engines and has particular relation to a crankcase structure for internal combustion engines for automotive and other uses.

It is proposed to provide an economical, reliable, and easily assembled and serviced structure for closing the lower part of the crankcase of an engine, for mounting the fuel pump of an engine and for supporting the oil control baffle covering the oil reservoir and the inlet for the fuel pump.

In the drawing:

Figure 1 is a fragmentary side elevational view of an engine with the parts at the rear end of the engine broken away and illustrated in section to better illustrate the interior structure of the engine.

Figure 2 is a cross sectional view of the structure disclosed by Figure 1, substantially at the rear end of the rear main bearing for the engine.

Figure 3 is a perspective view of the front end of the oil pan employed in the engine disclosed by Figures 1 and 2.

The engine 10 embracing the invention comprises an engine frame 11 having side walls 12 and transverse walls 13 with the lower edges thereof terminating substantially in the horizontal plane of the axis of rotation of the crankshaft 14 of the engine. The transverse wall 13 at the rear end of the frame 11 is formed to provide a rear main bearing 16, the remaining intermediate transverse wall being formed to provide intermediate main bearings 17 for supporting the crankshaft 14 of the engine. The bearings 16 and 17 have bearing caps 18 and 19 forming the lower parts thereof and secured to the lower edges of the transverse walls 13 by bolts 21. The lower part of the crankcase of the engine beneath the frame 11 is closed by an oil pan 22 having outwardly flanged edges 23 engaging a gasket 20 and adapted to be secured to the lower edges of the outer walls of the frame 11 by bolts 24. The rear main bearing 16 including the rear main bearing cap 18 extends rearwardly of the crankshaft 14 to provide a separable collar 26 for supporting a rear bearing shaft seal 27. The flange 23 at the rear end of the oil pan 22 curves downwardly around the collar 26 and in such manner as to extend around and below the rear end of the crankshaft 14. The front end 25 of the oil pan 24 and the flange 23 extending around the front end also slope obliquely and forwardly and downwardly around the front end of the crankshaft 14. The bolts 24 at the front end 25 of the pan secure the flanges 23 to obliquely disposed mating flanges 28 formed on the lower end of a timing gear cover 29. The cover 29 is bolted or otherwise secured to the front end of the frame 11. The shaft 14 is adapted to project through the front wall of the cover 29 and is provided with suitable sealing means to prevent leakage of oil through the front wall and around the shaft.

The rear end of the oil pan 22 is formed to provide a downwardly extending oil reservoir indicated at 31. The oil reservoir is adapted to contain the lubricating oil for operating the engine 10 and to supply oil to the inlet device 32 by which oil is admitted to the engine oil pump 33. In order to provide sufficient capacity within the oil reservoir 31 it is desirable not to extend the oil pan 22 downwardly to a great extent. It is considered preferable to obtain this capacity by making the oil pan relatively wide. In the present instance it is proposed to make the oil pan 22 relatively wide and to position the oil pan with respect to the engine frame and to form the engine frame so that a greater part of the crankcase of the engine is on one side of the vertical plane of the engine extending through the axis of rotation of the crankshaft of the engine. The vertical and parallel parts of the side walls 12 are more extensive on the wider side of the frame 11. This provides a sufficiently large crankcase for the engine and a sufficiently large oil reservoir within the oil pan 22 and provides room on one side of the engine and at the side of the rear main bearing cap 18 for installing the oil pump 33 on the lower edge of the rear transverse wall 13 of the engine. The oil pump 33 is positioned mostly in the lower part of the oil pan 22 but has an upwardly projecting support 34 that is flanged at 36 at the upper end thereof for receiving bolts 37 for independently securing the pump to the frame of the engine at one side of the bearing cap 18. It will be apparent that it is possible to remove the oil pump 33 from the engine merely by removing the bolts 37 and without removing the rear main bearing cap 18. It will also be apparent that it is possible to extend the driveshaft 38 for the oil pump 33 downwardly from the distributor of the engine and in such a way as to pass to one side of the crankshaft 14 and the rear main bearing 16. The pump 33 has an outlet passage extending upwardly through the support 33 and communicating with a lubricating supply passage formed in the frame 11.

The pump inlet 32 extends from one side of the pump 33 and is located directly below the crankshaft 14 and as near as is possible to the central part of the oil reservoir 31. Since the oil pump 33 is not secured to the rear main bearing cap 18 of the engine it is possible to secure the oil control baffle 39 to the bearing caps 18 and 19 by bolts 41. The oil control baffle 39 is adapted to closely fit the pan 22 at the upper part of the reservoir 31 and has a closely fitting recess for receiving the pump 33. The greater part of the baffle 39 is in a plane of the lower wall of the pan 22 in front of the reservoir 31. The baffle 39 is formed with centrally disposed upwardly extending projections 42 whereby the baffle 39 may be directly secured to the bearing caps 18 and 19 by the bolts 41.

I claim:

1. An engine crankcase structure comprising an engine frame having a part of the engine crankcase about the axis of rotation of the crankshaft formed therein, bearings formed in transverse walls of said frame and extending in spaced relation to one another throughout the length of said crankcase, a crankshaft for said engine mounted in said bearings, bearing caps forming the lower part of each of said bearings for securing said crankshaft in position, an oil pan secured to the lower edges of said frame for closing the lower part of said crankcase, said oil pan being formed to provide an oil reservoir therein, an oil pump secured to the lower edge of one of said transverse walls at one side of the bearing cap for the bearing of said one transverse wall, means for securing said oil pump to said one transverse wall independently of said bearing cap, said oil pump being formed to extend downwardly into said oil reservoir and having an inlet within said oil reservoir, said inlet being disposed in said oil reservoir beneath said crankshaft and between two of said bearings for said crankshaft, and a baffle disposed across the upper part of said reservoir and above said inlet and closely fitting the walls of said oil pan around the upper part of said reservoir, and means for removably securing said baffle to the bearing caps for said two bearings supporting said crankshaft.

2. An engine crankcase structure comprising an engine frame having a crankshaft mounted therein with the axis of rotation of said crankshaft substantially in the plane of the lower edges of the side walls and the transverse walls of said frame, a timing gear cover mounted on the front end of said frame with the front end of said crankshaft projecting through the front wall of said cover, an oil pan adapted to be secured to the lower part of said frame and surrounding said crankshaft beneath said frame and with said frame enclosing the crankcase for said engine, said oil pan and said timing gear cover in front of said frame and below and around the lower part of said crankshaft being formed to provide obliquely disposed mating flanges for securing said oil pan to said timing gear cover, and means for removably securing said flanges together.

3. A crankcase structure for engines comprising an oil pan having flanges projecting therefrom around the upper open end thereof for securing said oil pan to the frame of an engine, said oil pan being formed to extend around the lower part of the crankshaft of said engine at the rear of said engine and being formed to provide an obliquely disposed front end extending beneath and around the front end of the crankshaft for said engine, and means for securing said obliquely disposed front end of said oil pan to the lower end of the timing gear cover for said engine.

4. An engine crankcase structure as defined by claim 3 and in which said oil pan has side walls disposed at unequal distances on opposite sides of the axis of rotation of said crankshaft and the vertical plane of said engine extending through said axis, said oil pan at said rear end of said engine being formed to provide a recess disposed at unequal distances from said side walls for receiving said crankshaft and for positioning said walls at said unequal distances.

5. An engine crankcase structure comprising an oil pan adapted to be secured to the lower part of an engine frame for closing the crankcase for said engine, said oil pan being formed to provide recessed end wall means at opposite ends thereof to extend around and beneath the lower part of said frame and the crankshaft for said engine, said oil pan having side walls adapted to be disposed at unequal distances on opposite sides of the vertical plane of said engine extending through the axis of rotation of said crankshaft, said means being formed at one end of said pan to provide a recess receiving said crankshaft and said frame and disposed to position said side walls at said unequal distances.

6. An engine crankcase structure comprising an engine frame having a part of the engine crankcase about the axis of rotation of the crankshaft formed therein, bearings formed in transverse walls of said frame and extending in spaced relation to one another throughout the length of said crankcase, a crankshaft for said engine mounted in said bearings, bearing caps forming the lower part of each of said bearings for securing said crankshaft in position, an oil pan secured to the lower edges of said frame for closing the lower part of said crankcase, said oil pan being formed to provide an oil reservoir therein, an oil pump secured to the lower edge of one of said transverse walls at one side of the bearing cap for the bearing of said one transverse wall, and means for securing said oil pump to said one transverse wall independently of said bearing cap, said oil pump being formed to extend downwardly into said oil reservoir and having an inlet within said oil reservoir.

7. An engine crankcase structure comprising an engine frame having a part of an engine crankcase formed therein, a crankshaft mounted in bearings formed in said frame, an oil pan secured to the lower edges of said frame for closing the lower part of said crankcase, said oil pan being formed to provide an oil reservoir extending downwardly therein from the lower wall thereof, and a baffle extending across the upper part of said reservoir and beneath said crankshaft and substantially in the plane of said lower wall of said oil pan, and means for securing said baffle to the bearing caps for two of said bearings supporting said crankshaft immediately above said reservoir.

References Cited in the file of this patent

UNITED STATES PATENTS

| | | |
|---|---|---|
| 975,167 | Shultz | Nov. 8, 1910 |
| 1,422,622 | Riddle | July 11, 1922 |
| 1,623,462 | Belden | Apr. 5, 1927 |
| 1,631,208 | Jerome | June 7, 1927 |
| 1,647,434 | Chorlton | Nov. 1, 1927 |
| 1,660,599 | Davenport | Feb. 28, 1928 |
| 1,711,297 | Wiltse | Apr. 30, 1929 |
| 1,743,586 | Wiltse | Jan. 14, 1930 |
| 1,779,912 | MacPherson | Oct. 28, 1930 |
| 2,039,002 | Hutchison | Apr. 28, 1936 |